Aug. 25, 1936. H. ZOELLY 2,052,270
METHOD OF CONSERVING VICTUALS IN CLOSED CONTAINERS
Filed Dec. 5, 1933
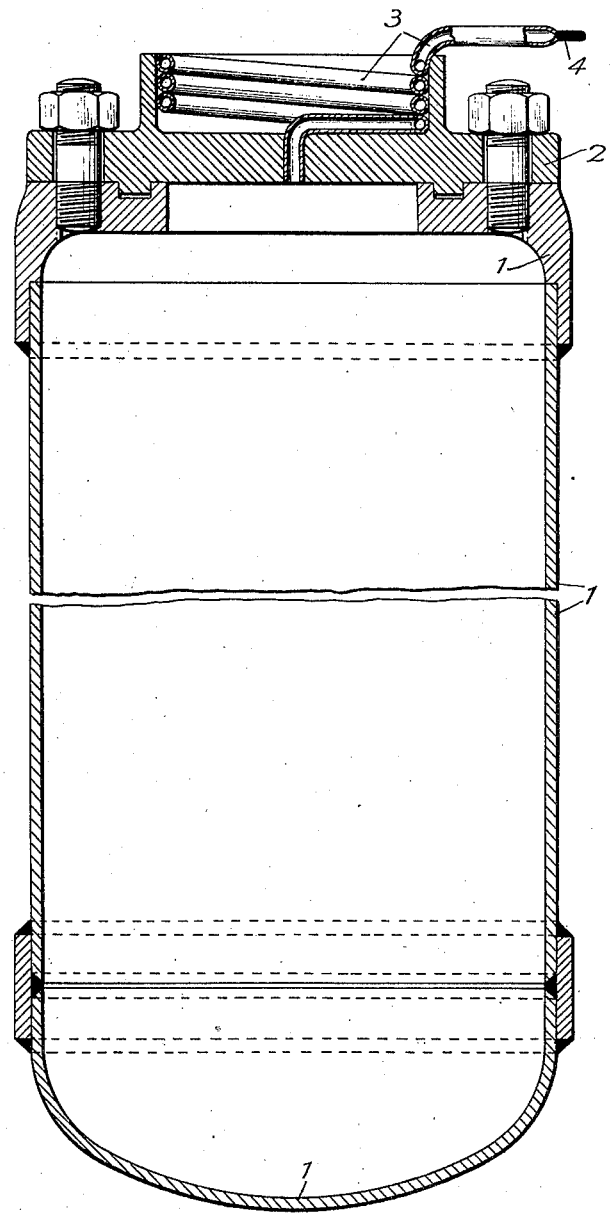
Inventor:
Heinrich Zoelly
By Sommers & Young
Attys.

Patented Aug. 25, 1936

2,052,270

UNITED STATES PATENT OFFICE 2,052,270

METHOD OF CONSERVING VICTUALS IN CLOSED CONTAINERS

Heinrich Zoelly, Zurich, Switzerland

Application December 5, 1933, Serial No. 701,036
In Germany December 9, 1932

2 Claims. (Cl. 99—165)

This invention relates to methods of conserving victuals in closed containers.

The most usual methods of conserving victuals consist in sterilizing and pasteurizing as well as storing the same in cool rooms. During the pasteurizing process the victuals are heated to a temperature of at least 60° C., whereas during sterilizing the temperature is raised to at least 100° C. In both cases the texture of the victuals, particularly in regard to the natural aspect, the taste, the aroma or the like is changed which is very often extremely undesirable, as the marketability of the victuals at a good price is thus considerably lessened. If, on the other hand, the victuals are simply stored in a cool room, it frequently happens that they deteriorate already in these rooms or else deterioration sets in a very short time after the victuals are brought back to normal atmospheric conditions. Storing the victuals for a longer time in a vacuum of but small intensity and approximately ordinary room temperature is also inhibitive, as under such conditions the microbes are very often still active.

Therefore, the known methods of conserving victuals are particularly disadvantageous for conserving victuals of especially delicate nature, such as fine sorts of fish, vegetables and fruit which must be safeguarded against losing their taste, changing the aroma or rotting.

The object of the present invention is to provide a method of conserving victuals and a container for carrying out the method by means of which provisions the disadvantages of the hitherto known conserving methods are eliminated. To this end, at first the air is removed by suction action as completely as possible from the containers filled with the victuals at a temperature below 15° C. up to at least 0.02 atmosphere i. e. 14.7 millimeters mercury. On the application of such an intense vacuum substantially no air is left in the container, only steam being still present therein, as for example at a vacuum of 98.26% and a temperature of 15° C.

the partial pressure of steam=0.0174 atm.
and the partial pressure of air   =0.0000 atm.
and thus the total pressure $p_t$   =0.0174 atm.

During removing the air from the containers by suction action, a short period of evaporation of the water contained in the victuals sets in, i. e. in addition to the air steam is withdrawn from the containers. As, however, this desiccating or evaporating period is but short and ceases entirely immediately on the required intense vacuum being attained, neither an undue drying nor a change of taste of the victuals to be conserved ensues. The evacuated containers are then removed to a cool room where the vacuum set up in the containers outside this room is still intensified, due to condensation of steam.

Since during carrying out the novel method all air is expelled from the interior of the containers, the presence of moisture entrapped in the containers, which is essential for preserving the taste and the natural aspect of the victuals, has no rotting or moulding effect or the like on the same.

In the accompanying drawing a constructional form of a container for carrying the method according to the invention into effect is illustrated in a longitudinal axial section and by way of example only.

By 1 the body of the container is designated and 2 refers to a removable cover thereof. The cover is joined with the container 1 in an airtight manner. On the cover 2 is arranged a small pipe 3 communicating with one of its ends with the interior of the container and consisting of a material which is adapted to be melted or welded. The other end of this pipe can be connected with a suitable device for withdrawing air by suction action. The tube 3 is closed in an air tight manner adjacent to its free end 4 by melting or welding every time after a vacuum is produced in the interior of the container 1.

The pipe 3 may be closed in still other manner, for example by means of a special cock, a valve or the like. The container 1, 2 may consist of sheet metal, cast material, glass and so forth. In choosing the dimensions of the container, the strength of the structural material is decisive in the first place with a view to avoiding the danger of buckling under an intense vacuum. It is advisable to make the containers of moderate size so as to avoid considerable weightiness in consequence of excessive wall thicknesses necessitated for reasons of strength. On the other hand the size of the containers depends on the purpose for which they are used. Depending on requirements, the containers can be stacked up in horizontal or vertical disposition.

The special shape of the container is immaterial for the purpose of the invention as long as it is suitable for the formation of an intense vacuum in the container. It is obvious that shapes other than that illustrated in the drawing may be chosen.

I claim:

1. A process for preserving foodstuffs, consisting in filling the foodstuffs to be preserved into a vessel at a room temperature of approximately 15° C., creating in said vessel an atmosphere of solely saturated water vapor by producing a vacuum at which the pressure of the water vapor present corresponds to the total pressure in the vessel at said room temperature, further in sealing the vessel, from which the air has thus been extracted, in an air tight manner, and storing said vessel at a temperature of approximately 0° C.

2. A process for preserving foodstuffs, consisting in filling at a room temperature of approximately 15° C. the foodstuffs to be preserved into easily transportable vessels, in which the foodstuffs may be left from the moment of their filling until the foodstuffs have to be consumed, creating in said vessels an atmosphere of solely saturated water vapor by producing a vacuum at which the pressure of the water vapor present corresponds to the total pressure in the vessel at said room temperature, further in sealing the vessel, from which the air has thus been extracted, in an air-tight manner, and storing said vessel at a temperature of approximately 0° C.

HEINRICH ZOELLY.